United States Patent [19]
Mizuno

[11] Patent Number: 5,349,465
[45] Date of Patent: Sep. 20, 1994

[54] OPTICAL DEMOCULATOR

[75] Inventor: Koji Mizuno, Sendai, Japan

[73] Assignee: Research Development Corporation of Japan, Tokyo, Japan

[21] Appl. No.: 913,661

[22] Filed: Jul. 16, 1992

[30] Foreign Application Priority Data

Jul. 16, 1991 [JP] Japan .................................. 3-199791

[51] Int. Cl.$^5$ .............................................. G02F 2/00
[52] U.S. Cl. .................................. 359/325; 250/551; 385/1
[58] Field of Search ................ 329/323, 324; 250/551, 250/227.23; 359/325; 257/184, 188, 189, 432; 385/1, 4

[56] References Cited

U.S. PATENT DOCUMENTS

| | | | |
|---|---|---|---|
| 3,403,257 | 9/1968 | Petroff | 359/325 |
| 4,856,095 | 8/1989 | Rauscher | 359/194 |
| 5,016,242 | 5/1991 | Tang | 359/124 |
| 5,039,951 | 8/1991 | Cheung et al. | 329/323 |
| 5,214,275 | 5/1993 | Freeman et al. | 250/551 |

FOREIGN PATENT DOCUMENTS

| | | | |
|---|---|---|---|
| 85/00080 | 1/1985 | European Pat. Off. | |
| 2198904 | 6/1988 | United Kingdom | 359/325 |

OTHER PUBLICATIONS

1990 IEEE MTT-S International Microwave Symposium Digest, vol. I, No. G-4, May 8, 1990, pp. 237-240, J. K. A. Everard et al., 'Microwave and MM Wave Photo-conductive Three-Wave Mixers for Coherent Detection . . . Signals'.

1991 IEEE MTT-S International Microwave Symposium Digest, vol. III, No. PP-6, Jun. 10, 1991, pp. 1293-1296, T. Newman et al., 'A Submillimeter-wave Planar Diode Mixer-Design and Evaluation'.

14th European Conference on Optical Communication (ECOC 88), vol. 2, Sep. 11, 1988, Brighton, UK, pp. 13-16, J. L. Gimlett, 'A New Low Noise 16 GHz PIN/-HEMT Optical Receiver'.

European Patent Search Report, Jul. 1, 1993.

*Primary Examiner*—Loha Ben
*Assistant Examiner*—Evelyn A. Lester
*Attorney, Agent, or Firm*—Fish & Richardson

[57] ABSTRACT

An optical demodulator includes a nonlinear element which responds to both light and a microwave-submillimeter wave (far infrared radiation). An optical signal modulated by a modulating wave in which a subcarrier consisting of the microwave-submillimeter wave is modulated by a signal wave, and a local oscillated signal consisting of a microwave-submillimeter wave the same in frequency as the subcarrier are added to the nonlinear element, to fetch the signal wave by a heterodyne system.

5 Claims, 2 Drawing Sheets

OPTICAL DEMOCULATOR

BACKGROUND OF THE INVENTION

The present invention relates to an optical demodulator used in a multi-channel optical communication system.

Conventionally, an optical demodulator for optical communication generally uses an avalanche photodiode which is capable of high-speed response. The maximum operation frequency of the avalanche photodiode in the response is several tens of GHz.

However, optical communication has the potential for demodulation up to several tens of THz. If the multi-channel capability is not utilized up to the demodulation of several tens of THz, then the advantages of optical communication in which light is used as a carrier are not sufficiently exhibited.

In this connection, the prior art has not sufficiently utilized the advantages of the optical communication, and development of an optical demodulator which operates at a frequency exceeding several tens of GHz has been desired.

SUMMARY OF THE INVENTION

It is an object of the invention to provide an optical demodulator capable of demodulating an optical signal modulated by a microwave-submillimeter wave which is an electromagnetic wave whose frequency exceeds several tens of GHz.

According to the invention, there is provided an optical demodulator comprising a nonlinear element which responds to both light and a microwave-submillimeter wave (far infrared radiation), wherein an optical signal modulated by a modulating wave in which a subcarrier consisting of the a microwave-submillimeter wave is modulated by a signal wave, and a local oscillated signal consisting of a microwave-submillimeter wave the same in frequency as the subcarrier are added to the nonlinear element, to fetch the signal wave by a heterodyne system.

A semiconductor diode such as a GaAs schottky diode or the like, or an FET (operable frequency: equal to or more than 100 GHz), a HEMT (operable frequency: up to approximately 100 GHz), an HBT (operable frequency: up to approximately 100 GHz) and the like are used as the non-linear element. Further, the optical signal is directly irradiated to the nonlinear element by the use of an optical fiber or the like. The local oscillated signal is applied to the nonlinear element through a line or the like which uses a dielectric such as a waveguide, a microstrip line or the like.

When the optical signal is irradiated to the nonlinear element, electric current whose frequency is the same as the modulated wave flows through the nonlinear element, by optical conduction effects. Simultaneously, when the local oscillated signal is applied to the nonlinear element, electric current with the same frequency as the subcarrier flows through the nonlinear element by voltage of the local oscillated signal. By nonlinearity of a current-voltage characteristic of the nonlinear element, electric current, that is, a signal wave, having differential frequency between the modulated wave and the subcarrier flows through the nonlinear element. This is demodulation or detection of the optical signal due to a heterodyne system.

With the above arrangement of the invention, it is possible to demodulate the optical signal modulated by an electromagnetic wave whose frequency exceeds that of a microwave-submillimeter wave, that is, several tens of GHz.

As described above, according to the optical demodulator of the invention, it is possible to demodulate the optical signal modulated by a microwave-submillimeter wave which is an electromagnetic wave whose frequency exceeds several tens of GHz. As a result, it is possible to sufficiently exhibit advantages of the optical communication which uses optic or light as a carrier.

DESCRIPTION OF THE EMBODIMENTS

Various embodiments of the invention will hereunder be described in detail with reference to the accompanying drawings.

Figure 1:
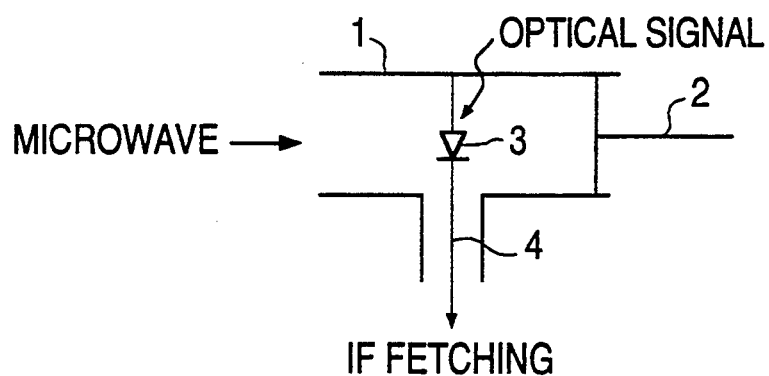
FIG. 1 is a schematic view showing a first embodiment of an optical demodulator according to the invention.

FIG. 1 is a schematic view showing a first embodiment of an optical demodulator according to the invention. The reference numeral 1 denotes a waveguide circuit on which a back short, i.e., a variable short-circuit plate 2 is mounted. The reference numeral 3 denotes a semiconductor diode which is loaded on the waveguide circuit 1 and which has such an energy level that, when an optical signal is irradiated, optical conductive current is generated. Further, a current-voltage characteristic of the semiconductor diode 3 has, in combination, high speed which can respond to a microwave-submillimeter wave. Specifically, the semiconductor diode 3 responds both to a microwave-submillimeter wave (far infrared radiation) which are light and electromagnetic waves of frequency exceeding several tens of GHz, although their principles are different from each other. The reference numeral 4 denotes a coaxial line.

The embodiment of the invention has been constructed as described above. Accordingly, when the optical signal modulated by a modulating wave (frequency: $f_m + \Delta f$) which is formed such that the subcarrier consisting of the microwave (frequency: $f_m$) is modulated by a signal wave (frequency: $\Delta f$) is irradiated to the semiconductor diode 3 through an optical fiber or the like, current iS whose frequency is $f_m + \Delta f$ flows through the semiconductor diode 3 by optical conduction effects.

On the other hand, when a local oscillated signal consisting of a microwave whose frequency is $f_m$ is simultaneously applied to the semiconductor diode 3 through the waveguide circuit 1, current iL whose frequency is $f_m$ flows through the semiconductor diode 3 by the voltage of the local oscillated signal.

Due to nonlinearity of the current-voltage characteristic of the semiconductor diode 3, current IF (intermediate frequency) having a differential frequency $\Delta f$ between the modulated wave and the local oscillated signal, that is, a signal wave flows through the semiconductor diode 3. This is demodulation (detection) of the optical signal due to the heterodyne system. The signal wave can be drawn out or fetched to the outside through the coaxial line 4 and the like by a diode loading part of the waveguide circuit 1.

Figure 2:
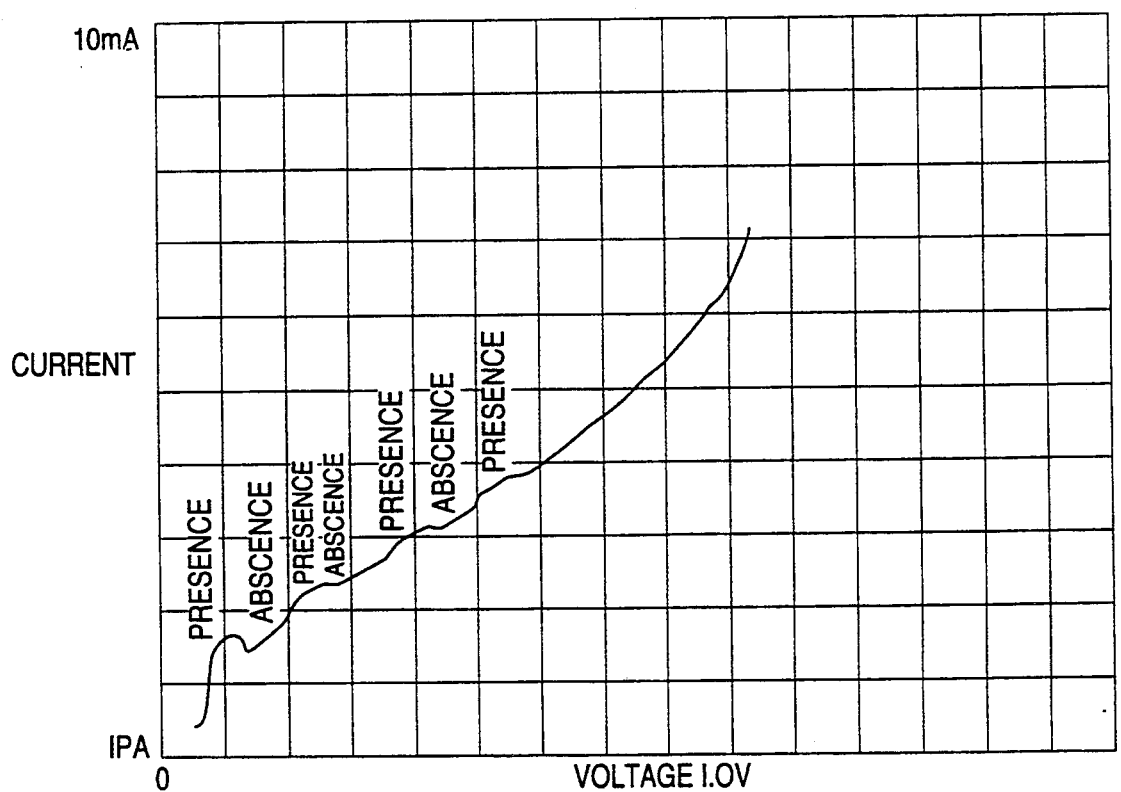
FIG. 2 is a graphical representation showing a current-voltage characteristic of a GaAs schottky diode that is one of semiconductor diodes.

FIG. 2 is a graph showing a current-voltage characteristic of a GaAs schottky diode that is one of the semiconductor diodes 3. In FIG. 2, "presence" and "absence" indicate presence and absence of irradiation of a He-Ne laser light, respectively. According to the graph illustrated in FIG. 2, the graph indicates that the characteristic curve varies depending upon presence and absence of the irradiation of the laser light. Thus, it will be clear that there is produced an IF output due to nonlinearity of the current-voltage characteristic of the GaAs schottky diode.

Figure 3:
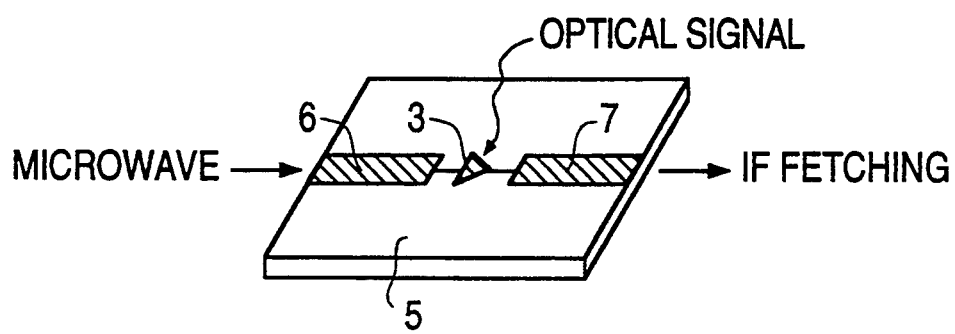
FIG. 3 is a perspective view showing a second embodiment of the invention.

FIG. 3 is a perspective view showing a second embodiment of the invention. The arrangement is such that a microstrip line 6 and a semiconductor diode 3 as well as a microstrip line 7 are formed on a semiconductor substrate 5, an optical signal is irradiated to the semiconductor diode 3, a local oscillated signal that is a microwave is simultaneously applied to the semiconductor diode 3 through the microstrip line 6, and an IF is fetched out of the microstrip line 7.

Figure 4:
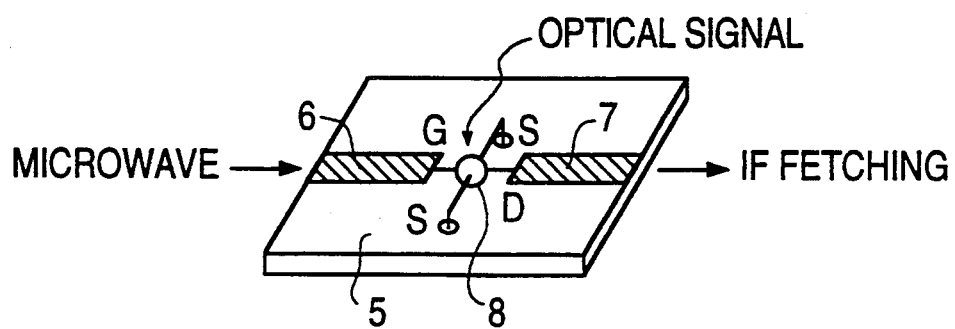
FIG. 4 is a perspective view showing a third embodiment of the invention.

FIG. 4 is a perspective view showing a third embodiment according to the invention. In the arrangement of the third embodiment according to the invention, a microstrip line 6 and an FET 8 (operable frequency: equal to or more than 100 HGz) as well as a microstrip line 7 are formed on a semiconductor substrate 5. The microstrip line 6 and the microstrip line 7 are connected respectively to a gate terminal G and a drain terminal D of an FET 8. An optical signal is applied to the FET 8 and, simultaneously, a local oscillated signal that is a microwave is applied to the gate terminal G of the FET 8 through the microstrip line 6. An IF is fetched from the drain terminal D through the microstrip line 7.

In connection with the above, it is possible to use transistors such as an HEMT (operable frequency: up to approximately 100 GHz), an HBT (operable frequency: up to approximately 100 GHz) and the like, in place of the FET 8.

What is claimed is:

1. An optical demodulator for demodulating a modulated optical signal wave to obtain a signal wave, said optical demodulator comprising:
   a semiconductor diode responsive to light and microwave-submillimeter waves;
   a waveguide circuit for applying a local oscillated signal to said semiconductor diode; and
   means for fetching a signal wave produced by said semiconductor diode by a heterodyne system,
   wherein said semiconductor diode produces the signal wave in response to simultaneous
      irradiation of said semiconductor diode with a modulated optical signal wave having a microwave-submillimeter subcarrier wave modulated by the signal wave, and
      application, via said waveguide circuit, of a local oscillated signal having the same frequency as the subcarrier wave to said semiconductor diode.

2. An optical demodulator according to claim 1, wherein said waveguide circuit is a microstrip line.

3. An optical demodulator for demodulation of an optical signal by a heterodyne system, comprising:
   a waveguide circuit;
   a semiconductor diode responsive to light waves and microwave-submillimeter waves for obtaining a signal wave from a modulated optical signal, said semiconductor diode loaded on said waveguide circuit, and generating optical conductive current when irradiated with an optical signal; and
   means for fetching the optical conductive current produced by said semiconductor diode by a heterodyne system.

4. A method of demodulating a modulated optical signal having a subcarrier microwave-submillimeter wave modulated by a signal wave to obtain the signal wave, comprising the steps of:
   irradiating the modulated optical signal on a semiconductor diode, and simultaneously
   applying a local oscillated wave having the same frequency as the subcarrier wave to said semiconductor diode.

5. A method as in claim 4, further comprising the step of fetching the obtained signal wave.

* * * * *

UNITED STATES PATENT AND TRADEMARK OFFICE
CERTIFICATE OF CORRECTION

PATENT NO. : 5,349,465

DATED : September 20, 1994

INVENTOR(S) : Koji MIZUNO

It is certified that error appears in the above-identified patent and that said Letters Patent is hereby corrected as shown below:

Title page of patent, item [54] should read --OPTICAL DEMODULATOR--.

Col. 1, line 1, should be the same.

Signed and Sealed this

Twenty-eight Day of February, 1995

Attest:

BRUCE LEHMAN

Attesting Officer     Commissioner of Patents and Trademarks